Figure 1:
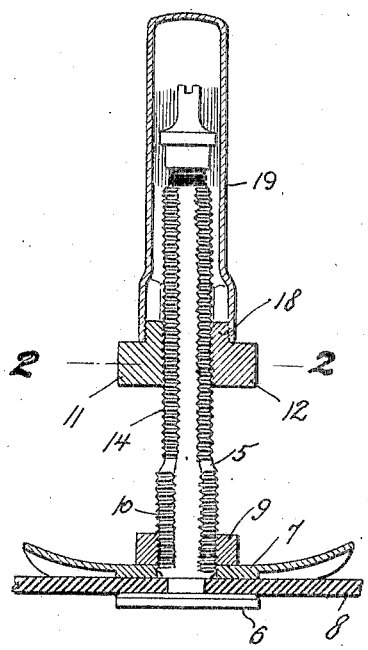

L. H. SHOUP AND E. H. WEBB.
TIRE VALVE.
APPLICATION FILED NOV. 16, 1918.

1,315,995.

Patented Sept. 16, 1919.

Inventors
Louis H. Shoup
Ernest H. Webb
By
Attorneys

UNITED STATES PATENT OFFICE.

LOUIS H. SHOUP AND ERNEST H. WEBB, OF MONTROSE, COLORADO.

TIRE-VALVE.

1,315,995.                Specification of Letters Patent.    Patented Sept. 16, 1919.

Application filed November 16, 1918. Serial No. 262,833.

*To all whom it may concern:*

Be it known that we, LOUIS H. SHOUP and ERNEST H. WEBB, citizens of the United States, residing at Montrose, in the county of Montrose and State of Colorado, have invented new and useful Improvements in Tire-Valves, of which the following is a specification.

This invention relates to inflation valves for the inner tubes of pneumatic tires, and more particularly to the stem or casing of the valve and the means whereby the latter is secured in place on the wheel rim or felly.

The invention has for its object to provide a fastening means by which the valve stem can be easily and quickly removed when the tire is to be taken off the wheel, and repairs to the inner tube are facilitated.

The object stated is attained by means of a novel combination and arrangement of parts to be hereinafter described and claimed, and in order that the same may be better understood, reference is had to the accompanying drawing, forming a part of this specification.

Figure 2:
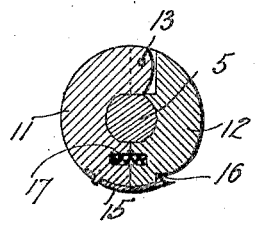

In the drawing,

Figure 1 is a central vertical section showing the application of the invention, and Fig. 2 is a cross section on the line 2—2 of Fig. 1.

Referring specifically to the drawing 5 denotes a valve stem having an enlargement or head 6 at its inner end, between which latter and a clamping plate 7 mounted on the stem, the tire tube 8 is held, the plate being forced inward to clamp the tube by a nut 9 screwed on the stem, the inner portion thereof being externally screw-threaded for the nut, as shown at 10. These parts are well known and constructed in the ordinary manner, and a further description thereof is therefore not necessary.

Ordinarily, the valve stem 5 also carries a lock nut engageable with the felly of the wheel, on the inside thereof, for clamping the stem in place. This lock nut must be removed from the valve stem before the tire can be taken off the rim, and as this operation consumes some time, a locking member has been devised which can be easily and quickly taken off the valve stem or put back thereon, said member being securely held in place without a threaded engagement with the valve stem. This locking member is a collar which is in two sections denoted by the reference characters 11 and 12, respectively, which latter are hinged or pivoted together as shown at 13 in Fig. 2. The hinge connection between the collar sections is such that they may be opened up or spread for application to the valve stem 5 or removal therefrom. Longitudinal movement of the collar on the valve stem is prevented by making the outside of the latter corrugated as shown at 14, and providing the inside of the collar with matching corrugations. Rotation of the collar is prevented by making the valve stem flat on diametrically opposite sides and shaping the inside of the collar correspondingly as shown in Fig. 2.

The collar section 11 carries a spring latch 15 which snaps into a notch 16 in the collar section 12 when the two sections are closed up around the valve stem 5, as shown in Fig. 2, whereby said sections are securely locked in this position.

The meeting faces of the collar sections 11 and 12 are recessed to house a spring 17 which spreads or opens up the sections when the latch 15 is disengaged.

The corrugations 14 are V-shaped so that a wedging action between the same and the corrugations on the inside of the collar sections 11 and 12 is produced when said sections are closed up around the valve stem 5.

The collar sections 11 and 12 are reduced on top, as shown at 18, and this reduced portion is externally screw-threaded to hold a dust cap 19.

To remove the collar composed of the parts 11 and 12, the cap 19 is first taken off, and the latch 15 is disengaged, whereupon the spring 17 spreads the sections so that they may be slipped off the valve stem 5 endwise. The collar is put back on the valve stem in a similar manner, and upon pressing the two sections together, the spring latch 15 snaps into the notch 16, whereupon the sections are locked in closed position. It will therefore be seen that the collar can be very easily and quickly taken off the valve stem or replaced thereon, and when in place it is securely held against longitudinal and turning movements on the stem.

The corrugated portion 14 of the valve stem 15 is smaller in diameter than the inner threaded portion 10 which carries the nut 9, so that the latter can also be quickly taken off after it is run off the portion 10 up to the portion 14. As ordinarily constructed the valve stem is threaded throughout its entire length, and the nut would have to be screwed from one end of the stem to the other. The reduced portion of the valve stem also makes it easier to push into the tube 8 when repairs to the latter are to be made, and it is also easier to put back through the hole in the tube after the repair is made, and these operations are effected without danger of tearing the hole larger.

We claim:

The combination with a tire valve stem; of a lock collar thereon and having an externally threaded outer portion, said collar being composed of hinged sections, means for holding said sections closed around the stem, coöperating means on the stem and the collar for holding the latter against longitudinal movement on the stem, and a dust cap having a threaded engagement with the aforesaid outer portion of the collar.

In testimony whereof we affix our signatures.

LOUIS H. SHOUP.
ERNEST H. WEBB.